United States Patent [19]

Layton

[11] 3,787,135
[45] Jan. 22, 1974

[54] VEHICLE AND VIBRATING COMPACTOR COMBINATION

[75] Inventor: Jack D. Layton, Salem, Oreg.

[73] Assignee: Layton Manufacturing Company, Salem, Oreg.

[22] Filed: Apr. 7, 1972

[21] Appl. No.: 242,000

[52] U.S. Cl. .............................. 404/113, 404/133
[51] Int. Cl. .......................................... E01c 19/34
[58] Field of Search .................... 404/113, 133, 102

[56] References Cited
UNITED STATES PATENTS

| 2,938,438 | 5/1960 | Hamilton | 404/113 |
| 2,723,608 | 11/1955 | Jackson | 404/113 |
| 2,909,970 | 10/1959 | Jackson | 404/113 |
| 3,342,118 | 9/1967 | Beierlein | 404/113 |
| 3,635,132 | 1/1972 | McIlrath et al. | 404/133 |

FOREIGN PATENTS OR APPLICATIONS

| 671,607 | 8/1939 | Germany | 404/133 |
| 1,119,179 | 12/1961 | Germany | 404/113 |

Primary Examiner—Roy D. Frazier
Assistant Examiner—Thomas J. Holko
Attorney, Agent, or Firm—Kolisch, Hartwell & Dickinson

[57] ABSTRACT

A vehicle and vibrating compactor combination, where the compactor is connected to the vehicle to move over the ground with movement of the vehicle. The compactor can be raised to elevate a compacting plate bottoming the compactor above the ground. Means in the combination provides for changing the position of the compactor and its compacting plate to enable it to be placed at different inclined positions with respect to the ground while in ground contact. This adjustment occurs with a change in the mode of operation of the compactor. Adjustable limit means defines the limits of different inclined positions for the compactor plate.

10 Claims, 7 Drawing Figures

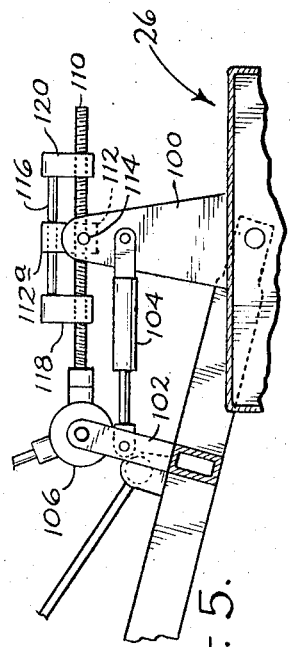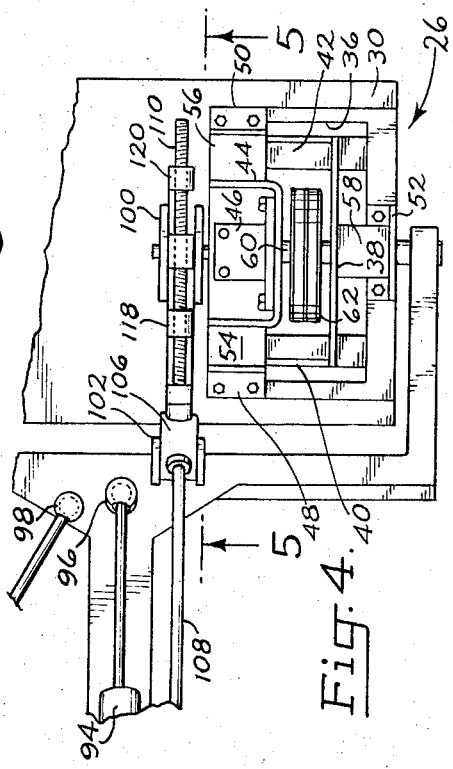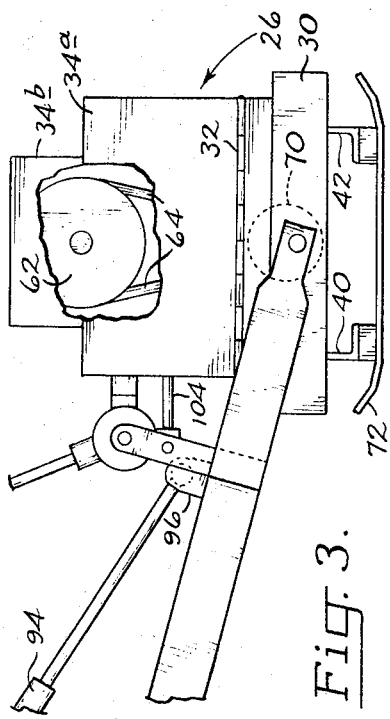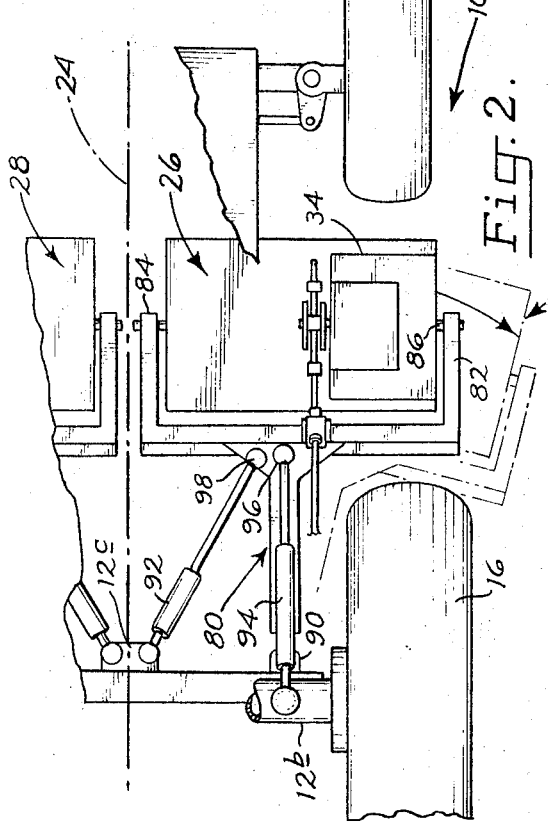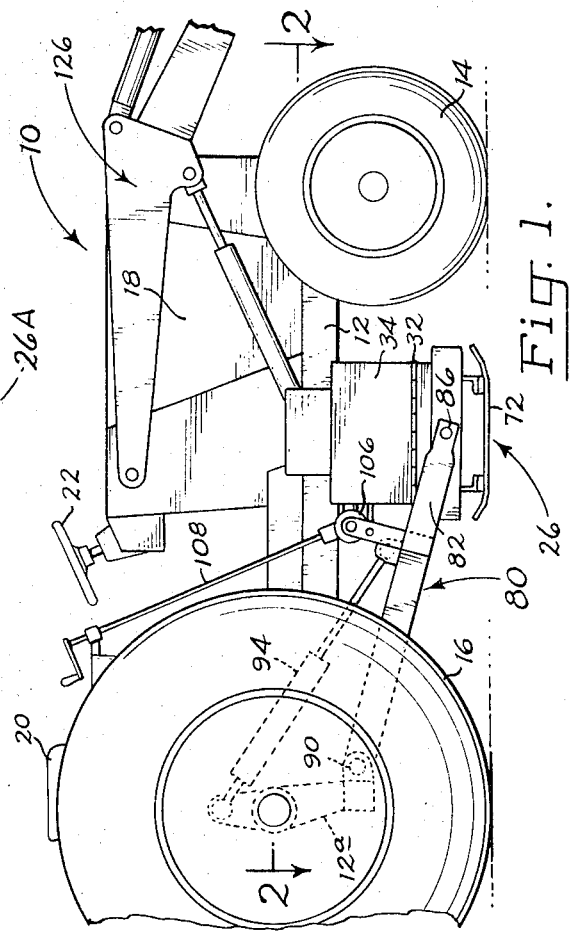

VEHICLE AND VIBRATING COMPACTOR COMBINATION

This invention relates generally to ground-working vehicles, and more particularly to a vehicle and vibrating compactor combination usuable to compact and densify the ground. Such an operation might be performed, for instance, as a step in a ground paving operation.

A general object of this invention is to provide a novel combination of vehicle and compactor providing means controllable by the vehicle operator for compacting a ground area in a highly effective manner.

Another object of the invention is to provide such a vehicle with compactor which permits the compaction of expanses of the ground which are either inaccessible or difficult to reach with conventional ground-working machinery.

A still further object of the invention is to provide a vehicle and vibrating compactor combination which includes means for adjusting the position of the compacting plate in the vibrating compactor relative to the ground when in ground-contacting position. The plate may be inclined to be provided proper lead when moving over the ground.

A specific object and feature of one embodiment of the invention is the provision of a vehicle with vibrating compactor where the vehicle comprises a road rolling machine and the compactor is disposed beyond one end of the machine and roller means at this end. The compactor and roller means follow in a common path during movement of the rolling machine. With the organization, the compactor may be utilized to produce a preliminary densification of material, with the roller of the rolling machine then passing over this material to finally compact the same.

In yet another embodiment of the invention, an object is to provide a vibrating compactor in a vehicle with a novel mounting for the compactor accommodating a special type of positioning of the compactor, whereby areas can be compacted which otherwise would be inaccessible to the machine.

Yet a further object is to provide a ground-working machine, i.e., a compacting machine, which comprises a combination of a rolling machine with vibrating compactor carried at one end, which enables significantly improved results to be obtained in the densifying and compacting of the ground in comparison to prior known devices. To indicate a few of these improved results, a compaction can be produced which is comparable or better than compaction produced by a rolling machine which includes an oscillating roller, for instance, without the ridging that such a machine sometimes produces and without the discomfort to the operator by reason of the operator being continually subjected to vibrations. In a rolling type of operation, the vibrating compactor can be raised, which has the effect of significantly increasing the amount of weight supported by the roller at said one end of the rolling machine.

These and other objects and advantages are attained by the invention, which is described hereinbelow in conjunction with the accompanying drawings, wherein:

FIG. 1 is a side elevation illustrating portions of a vehicle as contemplated herein, including a vibrating compactor mechanism supported from the vehicle frame between the front and rear wheels thereof;

FIG. 2 is a plan view, with portions broken away, illustrating the vehicle shown in FIG. 1;

FIG. 3 is a view on a somewhat enlarged scale further illustrating details of the vibrating compactor and the mounting which connects the compactor to the vehicle;

FIG. 4 is a plan view of the vibrating compactor shown in FIG. 3 with parts removed;

FIG. 5 is a view taken generally along the line 5—5 in FIG. 4;

Figure 6:
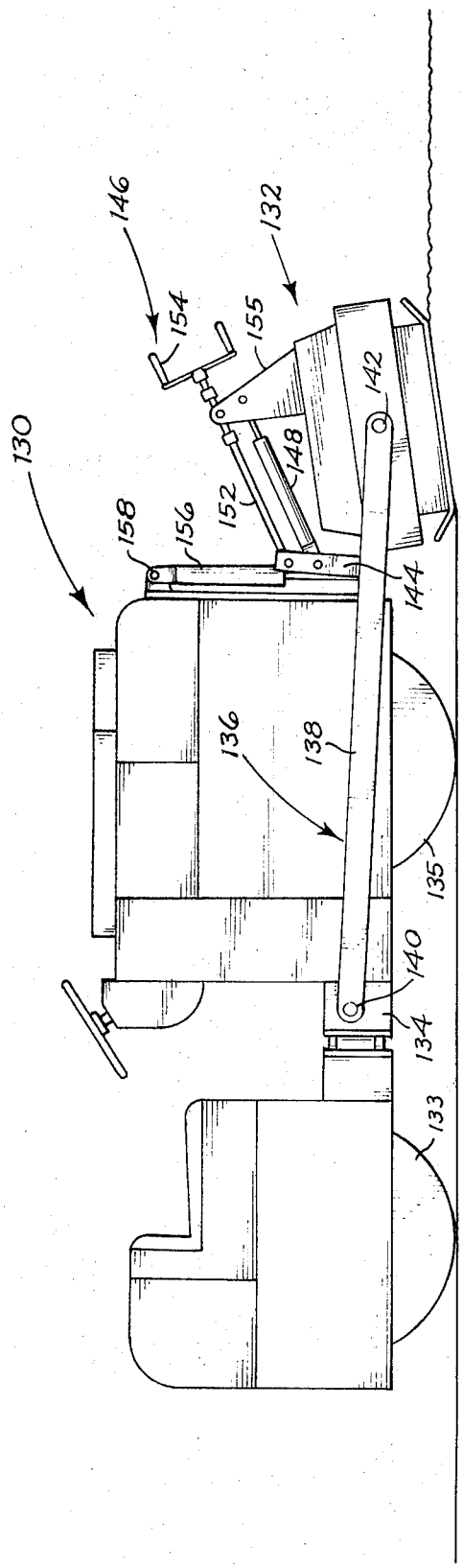
FIG. 6 is a view illustrating another modification of the invention which comprises a rolling machine having a vibrating compactor disposed beyond one end and mounted on the machine for travel therewith.

Referring now to the drawings, and first of all more particularly to FIGS. 1 and 2, indicated generally at 10 is a vehicle including a vehicle frame 12, front dirigible wheels such as wheel 14 and rear traction wheels such as wheel 16. At 18 is represented the power plant for the vehicle, which may typically be an internal combustion engine. In FIG. 1, portions of an operators seat are shown at 20. A steering wheel for steering the vehicle is indicated at 22.

Referring to FIG. 2, the midline of the vehicle extending longitudinally, i.e., extending between the front and rear of the vehicle, is indicated generally at 24. Supported underneath the frame of the vehicle between the front and rear wheels 14, 16, with one on one side and one on the other side of this midline, are a pair of vibrating compactors given the reference numerals 26 and 28.

The two vibrating compactors are similar in construction and only one will be described in detail. Referring now also to FIGS. 3 and 4, each includes what is referred to herein as a static frame 30 used in the mounting of the compactor on the vehicle. The static frame is also used in the mounting of a vibrating frame, a compacting plate which bottoms the vibrating compactor, and the motor and associated parts producing vibrations in the plate, as will hereinafter be described.

Specifically, hinged to the static frame by hinge 32 is a housing or casing 34 of a generally rectangular configuration and including a base 34a and an upper integral portion 34b of somewhat reduced dimensions. In FIG. 4 this housing has been removed, and portions of the housing have been broken away in FIG. 3, better to illustrate details of the vibration producing mechanism and associated parts.

Static frame 30 has a substantially rectangular opening 36 defined therein, viewing the frame in plan, and with the housing removed, as best illustrated in FIG. 4. Projecting partially up through this opening is a vertical plate 38 joined adjacent its base to horizontally disposed bars, portions of which are shown at 40 and 42 in FIG. 4. Plate 38, and bars 40, 42 make up what is referred to herein as a vibrating frame in the vibrating compactor.

Also part of the vibrating frame is an upright, substantially channel-shaped bracket (with the mechanism viewed in plan as shown in FIG. 4), such piece being illustrated at 44. This channel-shaped bracket extends upwardly a substantial distance through opening 36 and is employed in the mounting of a motor, such as the reversible hydraulic motor shown at 46.

A vibration-absorbing mounting is used in the mounting of the vibrating frame on the static frame. In the specific embodiment of the invention disclosed, such includes angle-shaped brackets 48, 50 and 52 suitably fastened to the static frame. Interposed between these brackets at opposite sides of the motor mounting bracket 44, are vibration-absorbing, elastomer pads 54, 56, each suitably secured at one side to the mounting bracket and at the opposite sides to one of the brackets 48, 50. A similar elastomer pad 58 is used in the mounting of plate 38 on bracket 52.

The output shaft 60 of motor 46 mounts pulleys 62 over which are trained belts 64. These belts extend downwardly from the pulley 62 and have lower reaches trained over suitable sheaves secured to a shaft (not shown) which is journaled on the vibrating frame and which mounts an eccentrically weighted rotor, shown generally in outline at 70.

Also part of the vibrating mechanism is the compacting or vibrating plate shown at 72 which bottoms the vibrating compactor. The plate is secured rigidly to bars 40, 42 in any suitable manner.

It should be apparent that with the construction described, and on rotation of the motor, through the inclusion of the eccentrically weighted rotor, a vibrating action will be induced in the vibrating frame and the compactor plate attached to it. The vibrating action is not limited to reciprocal vertical movement, but includes an oscillatory action in all directions. There is a tendency, therefore, for the compacting plate, were the compactor unrestrained, to hop over the ground as the same vibrates, with the direction in which such advances being dependent upon the direction of rotation of rotor 70 as produced by motor 46.

Considering the mounting of a vibrating compactor on the frame of the vehicle, shown generally at 80 is arm structure which is bifurcated at its lower extremity to present end portions 82, 84 straddling the compactor. These arm portions are pivotally mounted on the static frame of the compactor by pivot connections 86. The opposite end of arm structure 80 is mounted through a ball pivot 90 to a portion of the tractor frame shown at 12a. The ball pivot connection accommodates up and down movement of the forward extremity of the arm structure and also lateral or side-to-side swinging of this forward extremity.

Also shown, as perhaps best seen in FIG. 2, are a pair of fluid-operated rams 92, 94. Each is pivotally connected by ball pivot connections to the frame of the tractor at portions 12b, 12c. Rod portions are pivotally connected by ball pivot connections to the arm structure, at pivot connections shown at 96 and 98. Through manipulation of these rams the arm structure may be raised to lift the compactor off the ground. Further, the arm structure may be swung laterally outwardly, as shown in FIG. 2, to shift the compactor laterally outwardly, as to the position indicated at 26A in FIG. 2. In this way the compactor can be utilized to produce ground compaction in regions to one side of the path of the vehicle, an important capability when preparing an expanse of land for pavement which is up against a sidewalk under an obstruction, etc.

Referring now to FIGS. 4 and 5, joined to the static frame of the compactor is post structure 100. Joined to arm structure 80 adjacent its bifurcated extremity is post structure 102. Extending between these post structures, with opposite ends journaled on the post structures, is a fluid-operated double-acting ram 104. The ram may be extended from the position shown in FIG. 5 to swing the frame of the compactor in a clockwise direction in the figure, which has the effect of shifting the plane of the compactor plate from the horizontal plane shown in FIG. 3 to an inclined plane where the plate lies at an acute angle relative to the ground underneath it, which angle opens to the rear of the vehicle. This tilting of the plate provides for proper lead, when the compactor is moved from right to left in FIG. 3, such movement occurring with the vehicle in FIG. 1 moving to the rear. Similarly, with contraction of ram 104 the plate is canted or tilted in the opposite direction, to define with the ground underneath it an acute angle opening to the right in FIG. 3. This positioning of the compactor provides proper lead in the plate with the compactor moved from left to right or with the vehicle in FIG. 1 moving forwardly.

It is further contemplated in the instant invention that adjustable means be included for adjustably limiting the pivotally movement afforded the compactor, and thus limiting the inclination which can be produced in the compactor plate. Referring to FIGS. 4 and 5, a right-angle drive unit is shown at 106 which is journaled adjacent the top of post structure 102. Hand-crank-operated shaft 108 extending into the unit is connected by the usual gearing to threaded shaft 110 extending out of the unit which has reversely threaded portions at opposite extremities of the shaft. A sleeve 112 having the shaft 110 slidably extending through it is journaled at 114 to the upper extremity of post structure 100. Integral with the sleeve is an offset guide 112a slidably receiving a pin 116. Reversely threaded nuts 118, 120 are screwed onto the reversely threaded end extremities of threaded shaft 110. Pin 116 is secured to one of the nuts 118 and slidably passes through an accommodating bore in the other. The pin thus functions to hold the two nuts from relative angular displacement.

From this description it should be obvious that on turning the hand-crank-operated shaft 108, the nuts 118, 120 may be caused either to be moved away from each other, or to move toward each other, on the threaded shaft. The particular movement depends upon the direction in which the hand-crank-operated shaft is turned. With the nuts turned toward each other, the pivotal movement permitted the compactor to either side of the position where the compactor plate is horizontal is more restricted. Conversely, with movement of the nuts away from each other, the amount of pivotal movement afforded the compactor, before the limit positions defined by the nuts are reached, is increased.

Figure 7:
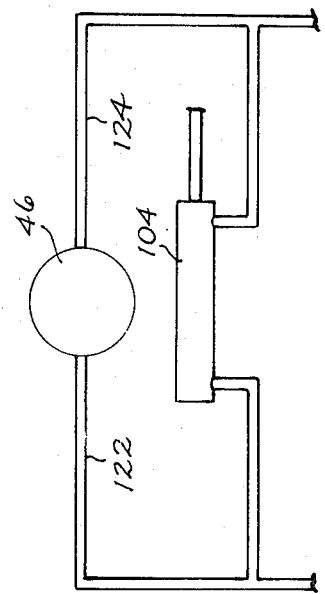
FIG. 7 is a hydraulic circuit that may be used in the invention.

It is comtemplated that a hydraulic circuit, similar to the one shown in very simplified form in FIG. 7, be provided for the supply and exhaust of fluid under pressure to the ram 104 and reversible motor 46 described earlier. With the circuitry contemplated, and with pressure fluid admitted to conduit 122 to cause rotation of the motor in one direction, ram 104 is actuated in one of its strokes. With hydraulic fluid introduced to conduit 124 to reverse the direction of rotation of the motor, ram 104 is actuated in the other of its strokes.

Earlier it was described that rotation of motor 46 tends to induce advancing movement in the compactor, with the particular direction of this advancing movement being dependent upon the direction of rotation of the motor. With the construction contemplated, when the motor is rotated, for instance, to tend to cause advancing movement of the compactor from left to right in FIG. 3 at the same time that the valve is adjusted to provide for the supply of fluid producing this direction of rotation in motor 46, ram 104 is actuated to be contracted, which has the effect of raising right-hand margins of the compactor plate in FIG. 3 to establish proper lead when moving from left to right. With reverse rotation of the motor 46, ram 104 is actuated in the opposite direction, to incline the compactor plate whereby it has proper lead when moving in the opposite direction.

A vehicle as contemplated has considerable utility in leveling or otherwise grading a land expanse in, for instance, part of a paving operation. Referring to FIG. 1, a bucket loader or other instrumentality, for instance, may be mounted on the supporting structure generally shown at 126, and utilized by the vehicle operator in the moving of earth and the preliminary smoothing of such material. A scraper blade, scarifying teeth, etc., may be mounted at the rear of the vehicle, which would also be at the operator's disposal in producing material movement tending to bring the area into grade. Compactors 26, 28 when lowered to come into ground contact, may be utilized as the grading proceeds by the operator of the vehicle in tamping or pounding the ground, either in the path of the vehicle or off to one side, finally to prepare the area for pavement.

Illustrated in FIG. 6 is another modification of the invention. In this instance, the vehicle combination includes a self-propelled vehicular rolling machine shown generally at 130, provided with a vibrating compactor designated at 132 mounted beyond one end of the rolling machine 130.

Further considering this modification of the invention, the rolling machine includes the usual frame 134 mounting enlarged weighted rollers or rolling means 133, 135.

In the apparatus of the modified form of the invention, compactor 132 is mounted on the vehicle, i.e., the rolling machine, through framework or arm structure 136 comprising a pair of arms like arm 138 disposed on opposite sides of the rolling machine journaled to the frame of the machine as at 140. The arms are pivotally mounted on the static frame of the compactor as at 142. Spanning the arms and joined to each is a bracket 144.

Compactor 132 may be similar to the compactors earlier described. The incline of the compactor plate bottoming the compactor is controlled by adjustable means 146 and a ram 148 extending between bracket 144 and a post 150 extending up from the static frame of the compactor. In this instance, the threaded shaft 152 of adjustable means 146 is turned directly by hand crank 154.

The compactor is raised from the ground to elevate its compacting plate from the ground surface through a hoist ram 156. Such has its top end journaled at 158 to a lug joined to the rolling machine. The bottom end of the hoist ram is journaled to bracket structure 144.

It will be noted that with the rolling machine moved forwardly in order to advance from left to right in the figure, ram 148 may be actuated to incline the plate so that it defines an acute angle facing forwardly, i.e., to provide the compactor plate with proper lead. With the machine moved in the opposite direction, the ram is actuated to reverse the lead whereby the plate defines an acute angle facing in the opposite direction.

With the machine of the modification, a high degree of compaction may be produced in the ground being worked. Thus, when compacting fresh, relatively undense material, the machine may be operated as shown in FIG. 6 with the compactor operating to produce a preliminary compaction of the material and a relatively smooth rolling surface for the roller means in the machine which follows the compactor. A smoother, more compacted surface is producible than using either instrumentality alone. Note also that a pounding effect is also possible without transmitting directly these vibrations to the rolling machine and the operator seated thereon. Additionally, it should be noted that a compactive effect can be produced which is superior, for instance, to the one produced with a rolling machine with a vibrating roller, the latter tending to produce ridges and valleys in the product being worked due to the oscillatory effect of the weighted roller.

In some types of operations the compactor may desirably be raised using the hoist ram 156. Since the compactor is carried forwardly of roller means 135, on raising of the compactor, its weight as well as part of the weight of rear roller means 133 is transferred to roller means 135. This effectively increases the rolling weight of roller means 135, a desirable advantage in obtaining final compaction of a given area.

From the above it should be obvious that the apparatus contemplated provides highly versatile and useful machinery for compacting and smoothing a surface. While various modifications of the invention have been described, it should be obvious that other variations are possible. It is desired herein to cover all such modifications and variations as would be apparent to one skilled in the art.

It is claimed and desired to secure by Letters Patent:

1. The combination of a ground-traveling vehicle,
a vibrating compactor bottomed by a vibrating compacting surface and means mounting the compactor on the vehicle with said compacting surface in ground-engaging position,
said vehicle including powered means operable to propel the vehicle in either of opposite directions,
the means mounting the compactor including means permitting shifting of said compacting surface to place said surface at different inclined ground-engaging positions depending upon the direction of vehicle travel, said means mounting the compactor including framework connected to the vehicle, pivot means connecting the compactor to said framework, and motor means interposed between said framework and compactor operable on actuation to shift the compactor about the pivot axis afforded by said pivot means thereby to change the inclined position of said compactor surface.

2. The combination of claim 1 which further comprises adjustable means limiting the pivotal movement afforded the compactor relative to said framework.

3. The combination of claim 1, wherein said vehicle comprises a self-propelled rolling machine including weighted roller means for rolling over the ground, and said compactor is mounted by said mounting means adjacent one end of the roller machine and in the path of said weighted roller means on movement of the rolling machine over the ground.

4. The combination of claim 1, wherein said framework includes an arm operatively connected to and extending from the vehicle, said arm being connected to said compactor at a point remote from the operative connection of the arm with the vehicle, and wherein said arm is swingable laterally of the vehicle to change the path of the compactor over the ground with movement of the vehicle.

5. The combination of claim 1, wherein the compactor includes an eccentrically weighted rotor and a reversible motor for driving said rotor in either of opposite directions to produce vibrations in the compactor, said motor means is double acting, and said reversible motor and motor means are operatively interconnected whereby a change in the direction of operation of said reversible motor is accompanied with a change in the actuation of said motor means.

6. IThe combination of claim 5, which further comprises adjustable means limiting the pivotal movement afforded the compactor relative to said framework, said adjustable means comprising a pair of adjustable stops, and wherein actuation of said motor means shifts the compactor to move the compactor to limit positions defined by either one or the other of said stops.

7. A self-propelled vehicular rolling machine including a machine frame having a weighted roller means mounted on said machine frame at one end of the rolling machine for rolling over the ground,
- a power-operated vibrating compactor including a static frame and a vibrating compactor plate bottoming the compactor disposed beyond said one end of the rolling machine,
- arm structure connected to said machine frame and extending from said machine frame outwardly beyond said one end of the rolling machine,
- means pivotally mounting an outer extremity of said arm structure on said static frame of said compactor, and,
- power-operated adjustable means interposed between said arm structure and said static frame of the compactor operable to place the compactor in one position wherein its said coompactor plate is in ground contact and inclined in one direction from a horizontal, and in another position wherein its said compactor plate is in ground contact and inclined in the opposite direction from a horizontal.

8. A ground-traveling vehicle including a vehicle frame and forward and rear wheel support means for supporting the vehicle for movement over the ground,
- a vibrating compactor including a static frame and a vibrating compactor plate bottoming the compactor,
- arm structure connecting the compactor to the vehicle frame having one end pivotally mounted on the vehicle and an opposite end pivotally connected to the static frame of the compactor, and
- remotely controlled motor means operatively interposed between the static frame of the compactor and said arm structure operable to place the compactor in one position wherein its said compactor plate is in ground contact and inclined in one direction from a horizontal, and in another position wherein its said compactor plate is in ground contact and inclined in the opposite direction from a horizontal.

9. The vehicle of claim 8, wherein the compactor includes an eccentrically weighted rotor and a reversible motor for driving said rotor in either of opposite directions to produce vibrations in the compactor, said motor means is double acting, and said reversible motor and motor means are operatively interconnected whereby a change in the direction of operation of said reversible motor is accompanied with a change in the actuation of said motor means.

10. The apparatus of claim 9, which further includes adjustable limit means adjustable to define two limit positions limiting the degree of movement afforded between the static frame and said arm structure.

* * * * *